United States Patent [19]

Huff

[11] Patent Number: 4,478,951

[45] Date of Patent: Oct. 23, 1984

[54] TITANIUM TRICHLORIDE CATALYST COMPONENT AND THE PROCESS FOR THE PRODUCTION THEREOF

[75] Inventor: Terrence Huff, Baytown, Tex.

[73] Assignee: Exxon Research & Engineering Co., Florham Park, N.J.

[21] Appl. No.: 455,168

[22] Filed: Jan. 3, 1983

[51] Int. Cl.³ ............................................. C08F 4/64
[52] U.S. Cl. .................................. 502/108; 502/118; 502/128; 502/127; 502/121; 502/122; 502/123; 502/125; 502/126; 502/127; 526/201; 526/144
[58] Field of Search ............... 502/108, 109, 118, 128, 502/126, 127, 125, 122, 121, 123

[56] References Cited

U.S. PATENT DOCUMENTS

| | | | |
|---|---|---|---|
| 3,135,809 | 6/1964 | Bosmajian | 502/103 X |
| 4,295,991 | 10/1981 | Wristers | 502/108 X |
| 4,324,693 | 4/1982 | Arzoumanidis et al. | 502/108 |
| 4,325,837 | 4/1982 | Capshew et al. | 502/108 |

Primary Examiner—Patrick Garvin
Attorney, Agent, or Firm—M. B. Kurtzman

[57] ABSTRACT

Extremely strong, i.e., non-friable $TiCl_3$ Ziegler-type polymerization catalyst are obtained by prepolymerizing a reduced solid $TiCl_3$ product with a mixture of propylene and linear $C_8$–$C_{18}$ alpha-olefin to produce a reduced solid $TiCl_3$ product containing 5 to 35 weight percent of a copolymer of propylene and $C_8$–$C_{18}$ alpha-olefin having a ratio of the infrared spectrum of the copolymer at 720 $cm^{-1}$: the infrared spectrum of the copolymer at 975 $cm^{-1}$ in the range of 0.04 to 0.20.

21 Claims, No Drawings

TITANIUM TRICHLORIDE CATALYST COMPONENT AND THE PROCESS FOR THE PRODUCTION THEREOF

BACKGROUND OF THE INVENTION

1. Field of the Invention

This invention relates to a titanium trichloride useful as Ziegler-type catalyst component. The invention further relates to the method of producing titanium trichloride catalyst component. More particularly, the invention relates to a highly active, highly crystalline shear resistant titanium trichloride which has been prepolymerized with a mixture of propylene and a higher alpha-olefin.

2. Related Art

Pretreatment of Ziegler-type catalysts with alpha-olefins is known in the art and some of the references are noted here. The pretreatment is generally performed in order to stabilize the catalyst. For example, in British Pat. No. 1,300,734 (published Dec. 20, 1972) of Shell International Research Maatschappij N.V., it is taught that by contacting a Ziegler-type catalyst comprising a titanium halide and an organoaluminum compound with a small amount of an alpha-olefin a stabilized catalyst is obtained. By "stabilization", the patent teaches that reduction of catalytic activity during polymerization reaction does not occur such that the overall activity is maintained at a high level.

In accordance with British Pat. No. 1,384,063 of Shell International Research Maatschappij N. V., there is disclosed a titanium halide aluminum trialkyl polymerization catalyst which is stabilized against deterioration during the polymerization reaction by prepolymerizing the catalyst at a temperature below 62° C. prior to its being employed in the conventional polymerization reaction.

In the British Pat. No. 1,408,611 (published Oct. 1, 1975) of Shell International Research Maatschappij N. V. there is disclosed the preparation of a titanium trichloride catalyst component which involves reducing titanium tetrachloride to a beta-type titanium trichloride, activating the titanium trichloride to a gamma titanium trichloride and thereafter contacting the same with propene in order to form a prepolymerized catalyst component.

In U.S. Pat. No. 3,404,096 of Lamborn, issued Oct. 1, 1968, there is disclosed a method of pretreating Zeigler-type catalysts with ethylene so as to form curdy catalyst component which is useful for obtaining friable fine catalyst particles.

In U.S. Pat. No. 3,689,597 of Mahlman, issued Sept. 5, 1972, there is disclosed a method of obtaining fine polypropylene particles by polymerizing propylene in the presence of a titanium trichloride catalyst which has been pretreated with alpha-olefins.

In U.S. Pat. No. 4,309,521, the titanium trichloride reduction product is activated for use as a polymerization catalyst by pretreating with an alpha-olefin or mixture of alpha-olefins.

In U.S. Pat. No. 4,325,837, a reduction in catalyst fines is achieved by prepolymerizing an aliphatic mono-1-olefin having 2 to 10 carbon atoms to provide a 1-50 weight percent prepolymer based on the total weight of the composition.

UK Patent Specification No. 1,135,697 discloses preparing fine catalyst particles for preparing fine particles of polyolfins by pretreating trivalent titanium precipitate with a straight-chain alpha-olefin or mixture thereof having 8 to 16 carbon atoms. By using 1 to 2.5 moles per mole of titanium of the alpha-olefin, the catalyst particles are fractured, i.e., highly friable.

The method of preparing the reduced titanium trichloride product which is employed in the prepolymerization of the present invention and the method of activation of the prepolymerized catalyst product do not form a part of the present invention and any of those methods disclosed in the art may be employed, although some particular methods are preferred.

Similarly other treatments such as that disclosed in U.S. Pat. No. 4,330,433 for producing large size catalyst may employ the present invention to produce stabilized catalyst of the large size. Briefly, that patent discloses a procedure for producing titanium catalyst by reducing titanium tetrahalide under controlled conditions of temperatures, reduction rate and concentrations to produce reduced titanium halide solids product seeds having an average particle size dimater of about 20 microns or greater and thereafter simultaneously and without interruption adding to the seeds containing system titanium tetrahalide and organometallic reducing compound at a rate to reduce the titanium tetrahalide to titanium trihalide of about $6 \times 10^{-4}$ to about 0.02 milli-moles per liter per second per meter$^2$ of available preformed titanium trihalide surface area until a solids product of desired size is obtained. The resultant product may be stabilized according to the present prepolymerization process.

The reduction of titanium tetrachloride is well documented in the art and described in numerous references and patents. Generally the titanium trichloride-containing compound is obtained by reducing titanium tetrachloride with an organoaluminum compound, preferably an alkylaluminum halide. For example, U.S. Pat. Nos. 4,085,064; 4,062,804; 4,172,514; 4,127,505; 4,182,691, and 4,210,738 disclose the general procedure and/or specialized variations thereon.

Several methods describing the activation of titanium trichloride obtained by low temperature reduction of titanium trichloride with an organoaluminum compound are described in the published patent literature. The activation is generally accomplished by contacting the reduction product of titanium tetrachloride with complexing agents and with various halogenated compounds to obtain a purple titanium trichloride which is useful as a cocatalyst with an organo-metal compound for the polymerization of alpha-olefins.

More particularly, in Japanese Patent Application (OPI) No. 34478/1972, published on Nov. 21, 1972 and corresponding to British Pat. No. 1,391,068 there is described a process which comprises treating the reduced solids obtained by low temperature reduction of titanium tetrachloride with an organoaluminum compound with a complexing agent, e.g., an ether, and titanium tetrachloride.

In Japanese Patent Application (OPI) No. 112289/1975, published Sept. 3, 1975, there is described a process wherein the titanium trichloride-containing reduced solids product obtained from the low temperature reduction of titanium tetrachloride in the presence of an organoaluminum compound is treated with a complexing agent, e.g., ethers, and then the resulting brown TiCl$_3$-containing catalyst is treated with carbon tetrachloride.

Additionally, in Japanese Patent Application (OPI) No. 143790/1975, published Nov. 19, 1975, a method is described comprising treating the reduced solids product with a mixture of a complexing agent and carbon tetrachloride.

In Japanese Patent Application (OPI) No. 149897/1976, published Dec. 23, 1976 and corresponding to British Pat. No. 1,484,086, there is described a process in which brown titanium trichloride obtained from the reduction of titanium tetrachloride in the presence of an organoaluminum halide and at low temperatures is subjected to heat treatment in the presence of a halogenated aliphatic or aromatic hydrocarbon in order to produce a violet titanium trichloride. It is further disclosed that the brown titanium trichloride obtained from the reduction step may be treated with a complexing agent, including ethers, prior to heat treatment.

In Japanese Patent Application (OPI) No. 227/1977, published Jan. 5, 1977, there is described a process which comprises heat-treating the reduction product of titanium tetrachloride with an organoaluminum compound, treating the reduced solid with a complexing agent and then treating the resulting solids with an alkylaluminum dihalide or titanium tetrachloride.

Furthermore, in U.S. Pat. No. 3,825,524 there is described a process for the production of titanium trichloride catalyst having a high activity which includes contacting a crude titanium trichloride composition, obtained by reducing titanium tetrachloride with an organoaluminum chloride, with a mixed solvent system composed of (i) a main solvent of aliphatic or aromatic hydrocarbons, aromatic chlorinated hydrocarbons or trichloroethylene, and (ii) an auxilliary solvent, including ethers. The mixed solvent system is employed for the purpose of extracting undesirable components from the reduction product.

In Japanese Patent Application Publication No. Sho. 52-142691, of Chisso Corp., published Nov. 28, 1977, there is described a method of producing a titanium halide catalyst component wherein a small amount of propylene is present during the preparation of the titanium halide obtained during the reduction of titanium tetrachlorie with an organoaluminum compound and thereafter treating the obtained reduced solid with a Lewis acid and/or a complexing agent.

In U.S. Pat. No. 4,295,991, there is disclosed the preparation of a titanium trichloride catalyst component which involves a low temperature reduction of titanium tetrachloride with an organoaluminum compound, treating the resulting reduced solids product with an alpha-olefin to obtain a non-friable prepolymerized reduced solid which can thereafter be activated with a halogenated hydrocarbon and a Lewis base or TiCl4 and a Lewis base.

It is well known that during the formation of polyolefin particles obtained in the presence of transition metal halide catalysts, such as titanium halides, the polymer particles are essentially replicates of the catalyst particles. It is further known that during the activation of the titanium halides obtained from the low temperature reduction of titanium tetrachloride that the transition metal halide particles are friable, i.e., they will shear into smaller particles, i.e., fines. Therefore, it is highly desirable to obtain transition metal halide catalyst components which are essentially non-friable during activation and when subjected to mechanical shearing forces which may occur either during activation or polymerization.

SUMMARY OF THE INVENTION

The present invention particularly relates to a method for prepolymerizing a titanimum trichloride reduced solid product with an given amount of a mixture of propylene and linear $C_8$-$C_{18}$ alpha-olefin to produce a non-friable, Ziegler-type catalyst, and the catalyst obtained thereby.

There is a great volume of art related to prepolymerization of the Ziegler-type TiCl3 catalyst component, however, the specific art relating to the use of higher alpha-olefins teaches that these olefins produce fracturing of the cstalyst particles (UK Patent Specification No. 1,135,697 noted above). However, the present invention provides the means of using these higher alpha-olefins copolymerized with propylene in the prepolymerization to produce catalyst particles without fracturing, (as desirable for conventional polymerization) of increased toughness compared to catalyst prepolymerized by other means at the same level of prepolymer present.

The toughness of the catalyst may be increased by the amount of prepolymer present thereon, however, in the utilization of the catalyst in an olefin polymerization, the presence of prepolymer reduces the amount of active catalyst present in the reactor. Hence the objective is to obtain the greatest (or desired) toughness with the least prepolymer present.

Using multiple linear regression as described, for example, in "Applied Regression Analysis", by N. R. Draper and H. Smith, John Wiley & Sons, Inc., NY, 1981, to reduce the experimental data to analytic form; it was determined that a very tough, i.e., non-friable Ziegler-type titanium chloride catalyst composition is obtained by contacting the titanium trichloride reduced solid product with an amount of a mixture of propylene and linear $C_8$-$C_{18}$ alpha-olefin to obtain a reduced solid TiCl3 product containing about 5 to 35 weight percent of a prepolymer consisting of a copolymer of propylene and $C_8$ to $C_{18}$ alpha-olefin, preferably 15 to 25 weight percent thereof, based on the total weight of titanium trichloride, wherein the ratio of the infrared spectrum of the copolymer at 720 cm$^{-1}$ to the infrared spectrum of the copolymer at 975 cm$^{-1}$ is in the range of 0.04-0.20.

The infrared band at 720 cm$^{-1}$ is generated by runs of four or more $CH_2$ groups, hence for the purposes of the present invention, it will represent a $C_8$ to $C_{18}$ alpha-olefins. The infrared band at 975 cm$^{-1}$ is generated by polypropylene. The ratio of the spectrums at 720 cm$^{-1}$ 975 cm$^{-1}$ is a qualitative measure of the amount of $C_8$-$C_{18}$ alpha-olefin present in the prepolymer.

Within the claimed range of the specified infrared spectrum ratios for the amounts of copolymer prepolymer the catalyst composition exhibits excellent toughness.

In order to determine what prepolymer compositions of propylene/$C_8$-$C_{18}$ alpha-olefins fall within the scope of the claims, some experimentation will be required, however, the experimentation would be routine and be that type of effort made by a party who would consider using the claimed procedure for stabilizing the TiCl3 Ziegler-type polymerization catalyst. For example, the experimentation would require merely carrying out the prepolymerization following the examples herein using a selected amount of prepolymer and after the prepolymerization and extraction of the non polymer components to determine the infrared spectrum of the copolymer at the indicated bands.

It should be appreciated that a higher ratio of 720/975 indicates a larger amount of alpha-olefin being present in the prepolymer. A preferred range of 720/975 ratio for all alpha-olefins is about 0.06 to 0.18, however, within the broad range it may be found that a particular $C_8$–$C_{18}$ alpha-olefin will have a preferred range to provide the greatest toughness and least polymer. For example, the preferred 720/970 ratio range for a $C_8$ alpha-olefin is 0.04–0.09 and more preferably 0.06–0.08, for $C_{12}$ alpha-olefin 0.06–0.20 and more preferably 0.10–0.18 and for $C_{18}$ alpha-olefin 0.07–0.15 and more preferably 0.10–0.13.

The toughness (non-friability) of the prepolymerized particles is determined empirically by visual observation of the degree of crushing obtained in the test described subsequently. As with any visual observation the absolute numbers may vary, however, the present tests were run on all samples in a single set and hence the relative ranking and the relative toughness would be the same.

In accordance with a preferred embodiment the present invention, a non-friably, highly active Ziegler-type titanium chloride catalyst composition is obtained by reducing $TiCl_4$ in the presence of an organoaluminum compound at a low temperature, e.g., in the range of about −50° C. to about 30° C., contacting the titanium trichloride reduced solid product with an amount of a mixture of propylene and linear $C_8$–$C_{18}$ alpha-olefin copolymer as heretofore described based on the weight of titanium trichloride thereby providing prepolymerized $TiCl_3$ reduced solid, and thereafter treating said prepolymerized titanium trichloride reduced solid product with one of (a) a chlorinated hydrocarbon having at least two carbon atoms and a Lewis base complexing agent or with (b) a Lewis acid such as $TiCl_4$ and a Lewis base complexing agent to convert said prepolymerized titanium trichloride reduced solid to a highly active, crystalline prepolymerized titanium trichloride composition.

The process of prepolymerizing the titanium trichloride reduced solid product, particularly that obtained from the low temperature reduction of titanium tetrachloride in the presence of an alkylaluminum compound results in titanium trichloride catalyst particles which are substantially resistant to fractionation, i.e., are non-friable, and therefore, can be readily converted to a purple form of titanium trichloride absent the production of "fines", by treatment of the prepolymerized titanium trichloride reduced solid with the halogenated hydrocarbon and Lewis base or by other methods of activation. The strengthening of the titanium trichloride reduced solid, therefore allows for a wider range of activation conditions, as well as use of variety of solvents and activators which would normally, at least partially, disintegrated titanium trichloride particles. In other words, the prepolymerization of the titanium trichloride reduced solid product (the contacting of the reduced solid under polymerization conditions with a mixture of propylene and $C_8$ to $C_{18}$ alpha-olefins) allows the reduction product to be activated under extreme conditions which heretofore would normally lead to catalyst attrition.

DETAILED DESCRIPTION OF THE INVENTION

The titanium trichloride-containing reduced solid used in the present invention may be obtained by reducing titanium tetrachloride with an organoaluminum compound and preferably an alkylaluminum halide at low temperature (e.g., −50° C. to +30° C.) as described in U.S. Pat. No. 4,182,691 which is a preferred method. In this procedure the alkylaluminum halide employed can be represented by the general formula $R_nAlX_{3-n}$, wherein R represents an alkyl group having 1 to 18 carbon atoms, most preferably 2 to 6 carbon atoms, X represents a halogen atom, most preferably chloride, and n can be within the range of 1 to 3 and preferably 1 to 2, or a mixture or complex compound thereof. Illustrative of suitable alkylaluminum compounds are trialkyaluminum, dialkylaluminum halides, monoalkyaluminum dihalides and alkylaluminum sesquihalides, mixtures or complex compounds thereof. Examples of trialkylaluminums which can be employed are trimethylaluminum, triethylaluminum and tributylaluminum and the like. Examples of the dialkylaluminum halides are dimethylaluminum chloride, diethylaluminum chloride, dibutylaluminum chloride, diethylaluminum bromide and diethylaluminum iodide and the like. Examples of the sesquihalides are ethylaluminum sesquichloride, propylaluminum sesquichloride and the like. Triethylaluminum, diethylaluminum chloride, ethylaluminum dichloride, ethylaluminum sesquichloride and mixtures thereof or complex compounds thereof, for example, a mixture of diethylaluminum chloride and ethylaluminum dichloride are particularly preferred.

The reduction step is carried out at a specified temperature which typically is between −50° C. and +30° C. by contacting titanium tetrachloride with the above-described organoaluminum compound. By way of example, to a solution of titanium tetrachloride in an inert solvent or diluent, e.g., a hydrocarbon having 5 to 12 carbon atoms such as n-pentane, isopentane, cyclopentane, n-hexane or isooctane, there is added dropwise a solution of alkylaluminum halide compound in said inert solvent or diluent. Conversely, a solution of titanium tetrachloride can be added dropwise to a solution of the alkylaluminum halide compound. Under carefully controlled conditions, the quantity of organoaluminum compound employed is generally about 0.5 to about 5 gram atoms as aluminum per 1 gram atom of titanium.

The specific temperatures and the amount of organoaluminum compound employed during the reduction step can be varied within the ranges disclosed herein, nevertheless associated with a specific organoaluminum compound there can be desirable concentrations and temperature ranges. In the case of diethylaluminum chloride, for example, (which will hereinafter be referred to as "DEAC") it is preferable to carry out the reduction at a temperature of about −50° C. to +30° C., particularly about −5° C. to about +5° C., and to use DEAC in a proportion of about 0.5 to about 5 moles, particularly about 0.8 to about 1.5 moles, to 1 mole of titanium tetrachloride. For a mixture or complex of dialkylaluminum halide and alkylaluminum dihalide, for example, DEAC and ethylaluminum dichloride (which will hereinafter be referred to as "EADC"), it is preferable to carry out the reduction at a temperature of about −50° C. to about +30° C., particularly about −5° C. to about +5° C., and to use DEAC in a proportion of about 0.5 to about 4 moles, particularly about 0.8 to about 1.5 moles, and EADC particularly about 0.1 to about 1.2 moles, respectively based on 1 mole of titanium tetrachloride.

The period of time of reactant addition during the reduction step may vary greatly, depending upon the quantity of reactants used and the desirability of maintaining a specified reduction temperature. However, reactant addition, e.g., dropwise addition, is generally carried out for a period of time of from about 30 minutes to about 10 hours.

Preferably, after reactant addition the reaction mixture is aged in order to complete the reduction reaction. Aging may be carried out by gradually elevating the temperature of the reaction mixture to a specified temperature within the range of about 20° C. to about 100° C. over a period of time of about 1 to 2 hours. Most preferably, aging is carried out by holding the reaction mixture, after reactant addition, at the reduction temperature for about one-half hour and then gradually elevating the temperature to about 65° C. for a period of time of about 1 hour and finally holding the reaction mixture at about 65° C. for about 1 hour. Caution should be taken during aging to prevent the titanium trichloride reduced solid from being subjected to conversion of the titanium trichloride containing reduced solid to a more crystalline form. For example, by subjecting the titanium trichloride reduced solid to too high a temperature for a prolonged period of time during the aging step crystal conversion could occur.

The reduction may also be carried out to produce a substantially fine-free, highly active Ziegler-type titanium trichloride catalyst component having a narrow particle size distribution and an average particle size diameter greater than 25 microns, desirably greater than 35 microns and preferably in the range of 40 to 60 microns or greater by adding an organoaluminum reducing compound with stirring to a solution of titanium tetrahalide in a suitable diluent at a temperature of about $-50°$ C. to about $+10°$ C. and is a molese ratio of between about 1:3 to 1.2:1 and at a rate such that the reduction of titanium tetrachloride to titanium trichloride is about 0.2 milli-moles per liter per second to obtain titanium trichloride solids product in the diluent having a narrow particle size distribution and an average particle size about or greater than 20 microns; and thereafter continuously and simultaneously adding with stirring to the titanium trichloride solids product in the diluent a Ziegler-type organoaluminum compound and titanium trichloride in a molar ratio of about 1:3 to about 1.2:1, the simultaneous addition being made at a rate such that the reduction of titanium tetrachloride to titanium trichloride is about $6 \times 10^{-4}$ to about 0.02 (preferably about $7 \times 10^{-3}$) millimoles per liter per second per $m^2$ (where surface area herein refers to that calculated from catalyst diameter, i.e., S. A. = Pi(Diameter, catalyst)$^2$ and does not include any internal voids) of available preformed titanium trichloride surface area until solids produce of desired size are obtained and thereafter recovering the titanium trichloride solids product. This procedure is more fully described in U.S. Pat. No. 4,330,433.

As noted above the specific method of reduction is not a part of the present invention. The trivalent titanium halide product can be expected to have improved catalyst stability and reduced fines when prepolymerized according to the present invention.

The so obtained titanium trichloride reduced solid is an amorphous solid having a complicated composition comprising, as a main component, titanium trichloride and the alkylaluminum compound employed in the reduction, or a reaction product of titanium trichloride and the alkylaluminum halide compound. This composition varies depending upon the exact reducing methods and conditions. Where titanium tetrachloride is reduced with a mixture of DEAC and EADC, it comprises, as a main component, titanium trichloride and EADC and, in addition, aluminum compounds in various forms, the proportion of aluminum being about 0.2 gram atoms or more to 1 gram atom of titanium.

The so obtained reduced solid contains titanium trichloride which is largely of the beta-type and is brown to red-violet in color, depending upon specific reduction conditions employed.

The titanium trichloride reduced solid obtained as described above can be prepolymerized, i.e., contacted with propylene and the comonomer linear $C_8$-$C_{18}$ alpha-olefin (designated as the "comonomer") under polymerization conditions, directly without the addition of a reducing cocatalyst or it can be separated, washed in an inert solvent or diluent, if desirable, and then prepolymerized.

The temperature of the reaction mixture during the comonomer application can be from about 0° C. to 100° C. preferably 25° C. is about 60° C. and most preferably from about 30° C. to about 40° C. As in the aging step, prepolymerization conditions should be such as to prevent conversion of the reduced solid to a more crystalline form.

The comonomer employed in accordance with the present invention for the prepolymerization of the titanium trichloride reduced solid can be added directly to the reaction product of the reduction step or it can be added to the washed reaction product in a suitable solvent. The amount of comonomer employed can be in a mole ratio per total titanium halide reduced solid employed in a range of about 0.1 to 4.0 times, and particularly at about 0.2 to 1.0 times. The mole ratios employed, therefore, will desirably provide titanium halide prepolymerized with about 5 to 35 wt.% of comonomer based on the weight of titanium halide.

Since the reaction rate of $C_8$-$C_{18}$ alpha-olefins is not rapid, the rate of addition thereof to the TiCl$_3$ is not critical and an excess thereof may be present. One method is to premix catalyst, hydrocarbon diluent, and linear alpha-olefin and then bubble propylene (which is gaseous at atmospheric pressure) through the liquid $C_8$-$C_{18}$ alpha-olefin/hydrocarbon diluent in contact with the TiCl$_3$. Another method is to premix the propylene and $C_8$-$C_{18}$ alpha-olefins under pressure conditions to maintain a liquid composition and to contact the TiCl$_3$ with the liquid monomer mixture under sufficient pressure to maintain the liquid phase. The amount of comonomer can be controlled by the ratio of propylene to alpha-olefin in contact with the reduced solids (to be determined for each set of conditions and comonomer composition). Normally, the TiCl$_3$ is agitated during the prepolymerization to afford greater contact with the monomer mixture. For example, in prepolymerization of 10.0 grams of TiCl$_3$ with 2.0 grams of gaseous propylene and 5.0 cc of liquid octadecene-1 diluted with 30 ml of hexane at atmospheric pressure, the reaction was continued for 10 minutes at 38° C. with the formation of 22.3 wt. percent prepolymer on the TiCl$_3$ (720/975 ratio 0.17). The weight percent prepolymer is determined by dissolving the inorganic phase, for example, with 10 vol. % sulfuric acid and determining the weight of prepolymer by difference.

The linear $C_8$–$C_{18}$ alpha-olefins employed are for example, 1-octene, 1-nonene, 1-decene, 1-hendecene, 1-dodecene, 1-tridecene, 1-tetradecene, 1-pentadecene, 1-hexadecene, 1-heptadecene, and 1-octadecene. As noted above under atmospheric conditions of pressure and the temperatures contemplated for the prepolymerization, these materials are liquids.

Upon completion of prepolymerization the titanium trichloride reduced solid now prepolymerized with a minor amount of copolymer is filtered and washed with an inert organic solvent so as to remove any hydrocarbon soluble reaction by-products.

In accordance with this invention, the prepolymerized titanium trichloride reduced solids obtained will manifest essentially no change in crystalline structure.

The prepolymerized reduced solid can be employed as a non-friable polymerization catalyst component.

The prepolymerized titanium trichloride reduced solid product, in accordance with a preferred aspect, can be activated to a highly active crystalline prepolymerized product in essentially two ways as generally described in the art. One can employ a chlorinated hydrocarbon in combination with a Lewis base complexing agent. It is preferable to employ the chlorinated hydrocarbon in combination with the Lewis base complexing agent.

As illustrative of the chlorinated hydrocarbons which can be employed are hexachloroethane, pentachloroethane, tetrachloroethane, trichloroethane, dichloroethane, monochloroethane, tetrachloroethylene, trichloroethylene, dichloroethylene, chloroethylene, octachloropropane, heptachloropropane, hexachloropropane, pentachloropropane, tetrachloropropane, trichloropropane, dichloropropane, monochloropropane, tetrachlorobutane, trichlorobutane, dichlorobutane trichloropentane, dichloropentane, dichlorohexane, dichloroheptane, dichlorooctance, dichlorobenzene, trichlorobenezene, monochlorobenzene, dichloropropene, trichloropropene, and dichlorobutene.

A variety of chlorinated hydrocarbons can be employed during actiation, e.g., the chlorinated products of aliphatic and aromatic hydrocarbons. The chlorinated products of aliphatic saturated hydrocarbons are generally more effective. Desirably the chlorinated aliphatic hydrocarbons will have from about 2 to 8 carbon atoms and from about 2 to 6 chlorine atoms per molesecule. The most preferred chlorinated hydrocarbons are the chlorinated ethanes. The effect of the chlorinated hydrocarbons appears to increase with the increased number of chlorine atoms per molesecule desired. Desirably, therefore, the chlorinated hydrocarbons employed can be one of hexachloroethane, pentachloroethane, tetrachlorethane, trichloroethane. Most preferably the chlorinated hydrocabon will be hexachloroethane.

The Lewis base complexing agent which can be employed will desirably contain at least one electron donating atom or group in the molesecule and will preferably be one of an ether, ester, ketone, thioether, organophosphoric compound or organonitrogen compound or mixtures of these compounds. Most desirably the Lewis base complexing agent will be a dialkyl ether such as, for example, diethyl ether, diisopropyl ether, di-n-butyl ether, diisobutyl ether, diisoamyl ether, di-2-ethylhexyl ether, di-2-ethylheptyl ether, allyl ethyl ether, allyl butyl ether, diphenyl ether, anisole, phenetole, chloroanisole, bromoanisole, dimethyloxy benzene, and the like.

Useful examples of the thioethers are diethyl thioether, di-n-propyl thioether, dicyclohexyl thioether, diphenyl thioether, ditolyl thioether, ethylphenyl thioether, propylphenyl thioether, diallyl thioether, and the like. Useful examples of the organophosphorous compounds which can be employed are tri-n-butyl phosphine, triphenyl phosphine, triethyl phosphite, tributyl phosphite, and the like. Useful examples of the organonitrogen compounds are diethyl amine, triethyl amine, n-propyl amine, di-n-propyl amine, tri-n-propyl amine, aniline, dimethylaniline, and the like. As indicated above, the ethers are most preferably employed and above all are dialkyl ethers, preferably the alkyl groups containing from 4 to 8 carbon atoms. Most preferred are dialkyl ethers containing 4 to 5 carbon atoms. The ethers so employed can by symmetrical or asymmetrical ethers and hence the alkyl groups are selected from the group consisting of n-butyl, isobutyl, n-amyl, isoamyl, 2-methylbutyl and 2-ethylpropyl. Most preferably di-n-butyl ether and diisoamyl ether and n-butyl isoamyl ether are employed as a Lewis base complexing agent to be used in combination with the halogenated hydrocarbon.

One may employ a Lewis acid in place of the halogenated hydrocabon. However, the Lewis acid combination with a Lewis base is less desirable with respect to the results obtained than the halogenated hydrocarbon in combination with a Lewis base. The Lewis acids which can be used are selected from the halides of Group II or Group VII metals and halides of silica or boron. Illustrative of the Lewis acids which can be employed are, for example, $MgCl_2$, $MnCl_4$, $AlCl_4$, $FeCl_3$, $TiCl_4$, $VCl_4$, $VCl_3$, $NiCl_2$, $CoCl_2$, $BCl_3$, $BF_3$ and $SiCl_4$. The preferred Lewis acid is $TiCl_4$.

The amount of Lewis acid employed can be from about 0.05 to about 50 times that of the weight of the prepolymerized titanium halide and preferably is from about 0.45 to about 15 times.

The proportion of Lewis base complexing agent employed is preferably between 0.1 and 2.5 moles, and especially between 0.5 and 1.8 moles, per mole of $TiCl_3$ present in the reduced solid. About 1 moles Lewis base per moles of $TiCl_3$ present in the reduced solid gives particularly good results.

The activation step, i.e., the conversion of the prepolymerized reduced solid to a highly crystalline form of titanium trichloride is accomplished by contacting the prepolymerized reduced solid with either the chlorinated hydrocarbon and Lewis base complexing agent or the Lewis acid and Lewis base complexing agent. The contacting can be carried out by adding the prepolymerized reduced solid to an inert solvent or diluent, such as previously described so as to prepare a suspension and then adding, for example, the ether and hexachloroethane thereto in order; by adding the ether to the prepolymerized reduced solid to prepare a suspension and then adding thereto hexachloroethane as a solution of hexachloroethane in the ether or an inert solvent; or by adding the prepolymerized reduced solid to a mixed solution of the ether and hexachloroethane or a mixed solution of ether, hexachloroethane and an inert solvent. The most convenient and favorable method consists in suspending the reduced solid in an inert solvent and then adding a mixture of ether, hexachloroethane and an inert solvent to the suspension.

The chlorinated hydrocarbon such as hexachloroethane and the ether can be in a mole ratio to the titanium halide in the reduced solid of about at least 0.2 moles or more, preferably 0.1 moles to about 2.5 moles of ether and 0.5 to 1.5 moles of hexachloroethane. Greater or lesser ratios can be employed. However, the most desirable effects are obtained by employing the so stated specific mole ratios.

Generally the chlorinated hydrocarbon is employed in an amount of about 0.2 moles to about 3.0 moles per gram atom of titanium in the prepolymerized reduced solid and preferably the chlorinated hydrocarbons will be in the range of about 0.5 moles to about 1.5 moles particularly in the range of about 0.6 moleses to about 1.2 moles per 1 gram atom of titanium in the prepolymerized reduced solid. Greater amounts of chlorinated hydrocarbon can be employed, however, no benefit is obtained therefrom. Lesser amounts of chlorinated hydrocarbon results in a less active catalyst.

The activation step is generally carried out at a temperature of about 50° C. to about 100° C. for a period of time of about 1 to 10 hours. Utilization of temperatures outside these ranges can be employed. However, activity of the catalyst appears to be best when the specified temperatures are employed. Most preferably, activation is carried out with the chlorinated hydrocarbon and ether at a temperature of about 80° C. to about 90° C. for about 3 to about 7 hours. Upon completion of the activation step the so obtained prepolymerized titanium trichloride catalyst composition is separated from the solvent, washed with an inert solvent or diluent and optionally dried in conventional manners. During the treatment step, the titanium halide of the reduced solid is converted whereby the so obtained titanium trichloride catalyst contains predominantly titanium trichloride of the delta type, according to the classifications generally adopted (Journal of Polymer Science, 51, 1961, pp. 399–410). The so obtained titanium trichloride catalyst has a violet to purple color.

The titanium trichloride catalyst of the present invention is ordinarily employed as a catalyst for the polymerization of alpha-olefins by contacting the same with an organo-metal compound wherein the metal is from Group 1a, 2a, 2b, or 3 of the Periodic Table, which is used as a cocatalyst for the Ziegler-type catalyst, for example, diethyl zinc, diethyl beryllium, monoalkylaluminum dichloride, dialkylaluminum monochloride, aluminum sesquihalide, trialkylaluminum and the like. One may also employ various compounds, for example, complexing agents such as ethers, amines or amides as well as phosphorous-containing compounds and nitrogen. The catalyst system for the polymerization of alpha-olefins employing the prepolymerized titanium trichloride catalyst of the present invention is exceedingly active for the homopolymerization or polymerization of alpha-olefins such as propylene, butene-1, 4-methyl pentene-1, ethylene and the like and gives uniform polymer particles and a high degree of stereoregular polymers. When these catalysts are used to polymerize propylene, for example, the catalytic activities are somewhat greater than about 2,200 grams of polymer formed per gram of titanium trichloride having at least 95% heptane insolubles content in a ½ hour liquid propylene polymerization at 70° C.

By so encapsulating the reduced solids particles in a polymer matrix the particles are strengthened to resist mechanical attrition, to resist particle breakup to fines when subjected to solvents and to resist particle breakup to fines during the activation step. Unexpectedly, the prepolymerization, performed in accordance with this invention does not cause agglomeration or fracture of the catalyst particles, but desirably allows the catalyst particles to retain their shape during activation and throughout any further polymerization reactions. These advantges are obtained even when the catalysts are employed in harsh solvents such as toluene.

The invention will be more clearly understood by reference to the following examples. These examples illustrate specific embodiments of the present invention and should not be construed to limit the invention in any way.

EXAMPLES

Example 1—Preparation of the Titanium Halide Reduced Solid

This Example is illustrative of methods for preparing the reduced solids used in the prepolymerization.

To a 500 ml flask equipped with a stirrer and placed in a thermostat-controlled bath at 0° C. there was placed 151.2 ml of 60 wt.% titanium tetrachloride in purified hexane. To the stirred mixture (200 rpm) was added dropwise 134 ml of a mixture of 99.2 ml of diethylaluminum chloride, 38.09 grams of ethylaluminum dichloride and 136 ml of purified hexane added over a period of 4 hrs. The reaction mixture was kept at 10° C. under constant stirring for a period of 4 hours and then the temperature was increased incrementally over 1 hour to about 65° C. and aged for 1 hour at a temperature of 65° C., then cooled to 38° C., filtered and washed with inert hydrocarbon in a dry box and finally dried under vacuum (approximately 5 mm Hg) at room temperature.

Examples 2–18—Prepolymerization

In these examples the following procedure for the prepolymerization was used. A 250 ml bottle held in controlled temperature shaker bath at 38° C. was used for each polymerization. Ten grams of dried reduced solids prepared essentially as in Example 1 were added to the bottle along with 30 ml of dry hexane and either 0, 5, or 10 ml of the liquid $C_8$–$C_{18}$ alpha-olefin as indicated in Table I. The bottle was inserted in the shaker bath maintained at a temperature of 38° C. and suitabily agitated. The bottle was purged with propylene and propylene was then passed, subsurface, through the constantly agitated slurry in the amount shown in Table I (note the increasing content of $C_8$–$C_{18}$ alpha-olefin in copolymer causes the prepolymer to be more soluble in hydrocarbons and reduces prepolymer on catalyst). The agitation was continued for one hour at 38° C. after completion of propylene addition (about 10–30 minutes). Upon completion of the prepolymerization the catalyst, i.e., prepolymerized reduced solids are examined on an optical microscope. The microscopic study revealed no gross change in crystalline structure of the $TiCl_3$ reduced solids.

In TABLE I the amounts of propylene and the second alpha-olefin are set forth.

After the prepolymerization was completed the catalyst was washed 4 times with hot hexane and dried at about 5 mm Hg pressure at room temperature.

The weight percent of prepolymer was determined by weighing a sample of each polymerized $TiCl_3$, dissolving the inorganics with 10 volume % aqueous sulfuric acid, washing and drying the residual prepolymer and weighing the residual.

A portion of the residual was melt pressed to a thin film and subjected to a infrared analysis using a Digilab FS-15E Fourier transform infrared spectrometer. The infrared spectrums at 720 cm$^{-1}$ and 975 cm$^{-1}$ are reported in TABLE II.

The catalysts were activated by the following standard method:

To a 250 ml glass bottle there was added 10 gm of prepolymerized reduced solid as prepare in accordance with Example 2. To the bottle was added 163 ml of nonane as a solvent. This slurry was heated to 65° C. in a controlled temperature shaker bath and 24 ml of activator solution consisting of 48 millimoles of di-n-butyl ether (DNBE) and 33 millimoles of hexachloroethane in nonane was added to the reduced solids slurry in time intervals of one minute. With controlled shaking the temperature was then increased to 85° C. in 15 minutes and held at that temperature for 5 hours. The catalyst turned purple.

The catalyst particles are filtered from the solvent and washed with boiling hexane. Upon examination under the microscope, the catalyst was noted to be crystalline and resistant to mechanical shearing forces. Catalyst fines were absent.

The ratio of aluminum/Ti after activation was determined. All catalyst tested had acceptable levels of residual aluminum (lower levels being preferred).

The resistance to mechanical shearing was measured by the following crush test procedure:

1. Add 0.1 gm catalyst to 5 ml dry white oil. Cap the vial in a nitrogen environment substantially free of moisture and oxygen (dry box).
2. With syringe remove small amount of slurried catalyst in white oil; place one or two drops of slurry on slide plate; cover with cover plate.
3. Take photomicrograph at convenient magnification (usually 200×); crush sample by pressing on cover plate with pencil point using rotary motion and slight hand pressure.
4. Observe result and take photomicrograph; rank toughness qualitatively.

| Rating: | |
|---|---|
| 1. | no observed change |
| 2. | increasing flattening of granules and tearing at edges |
| 3. | |
| 4. | |
| 5. | granule mashed flat, some tearing at edges, few fines |
| 6. | increasing friability and fines generation |
| 7. | |
| 8. | |
| 9. | |
| 10. | all particles crushed mass of fines |

The analytical, infrared ratio of relevant bands, and toughness for each prepolymer TiCl$_3$ sample are reported in TABLE II.

The catalyst were evaluated for the polymerication of propylene. The coprepolymerization catalysts were found to be equivalent in polymerization activity to the propylene prepolymerized catalysts and to the non-prepolymerized catalysts. The coprepolymerized catalysts of the present invention maintained their integrity during polymerization to form little or no finely dispersed polymer.

TABLE I*

| Example | Polypropylene Grams | Alpha-Olefin Type | Alpha-Olefin Vol % | Reduced Solids Grams |
|---|---|---|---|---|
| 1 | 1.2 | C8 | 0 | 10 |
| 2 | 3.0 | C8 | 0 | 10 |
| 3 | 2.0 | C8 | 14 | 10 |
| 4 | 2.0 | C8 | 14 | 10 |
| 5 | 1.0 | C8 | 25 | 10 |
| 6 | 2.7 | C8 | 25 | 10 |
| 7 | 1.2 | C12 | 0 | 10 |
| 8 | 3.0 | C12 | 0 | 10 |
| 9 | 2.0 | C12 | 14 | 10 |
| 10 | 2.0 | C12 | 14 | 10 |
| 11 | 1.0 | C12 | 25 | 10 |
| 12 | 2.7 | C12 | 25 | 10 |
| 13 | 1.2 | C18 | 0 | 10 |
| 14 | 3.0 | C18 | 0 | 10 |
| 15 | 2.0 | C18 | 14 | 10 |
| 16 | 2.0 | C18 | 14 | 10 |
| 17 | 1.0 | C18 | 25 | 10 |
| 18 | 2.7 | C18 | 25 | 10 |

*250 ml bottle, shaker bath at 38° C. 30 ml hexane and indicated quantity of alpha-olefin liquid.

TABLE II

| EXAMPLE | PREPOLYMER WT. % | AL/TI ACTIVE SOLIDS | INFRARED RATIO 720/975 | TOUGHNESS RANK |
|---|---|---|---|---|
| 1. | 12.4 | 0.051 | 0.051* | 7 |
| 2. | 27.8 | 0.047 | 0.032* | 5 |
| 3. | 30.1 | 0.042 | 0.059 | 3 |
| 4. | 17.2 | 0.057 | 0.097 | 1 |
| 5. | 10.4 | 0.063 | 0.15 | 9 |
| 6. | 19.5 | 0.052 | 0.72 | 8 |
| 7. | 23 | 0.092 | 0.035* | 4 |
| 8. | 34 | 0.119 | 0.026* | 1 |
| 9. | 18 | 0.086 | 0.08 | 3 |
| 10. | 11 | 0.139 | 0.13 | 2 |
| 11. | 10 | 0.118 | 0.13 | 5 |
| 12. | 5 | 0.2 | 0.33 | 8 |
| 13. | 15.6 | 0.054 | 0.091* | 5 |
| 14. | 30.0 | 0.042 | 0.032* | 6 |
| 15. | 18.6 | 0.061 | 0.16 | 3 |
| 16. | 22.3 | 0.102 | 0.17 | 4 |
| 17. | 18.1 | 0.043 | 0.11 | 2 |
| 18. | 10.0 | 0.049 | 0.18 | 2 |

*Observed band at 720 in the absence of C8–C18 olefins represents incidential polyethylene resulting from dissociated residual reactants (see Example 1)

The invention claimed is:

1. A non-friable, Ziegler-type TiCl$_3$ catalyst composition obtained by contacting a reduced solid TiCl$_3$ product with an amount of a mixture of propylene and linear C$_8$–C$_{18}$ alpha-olefin under polymerization conditions to obtain a reduced solid TiCl$_3$ product containing about 5 to 35 weight percent of prepolymerized copolymer of propylene and linear C$_8$–C$_{18}$ alpha-olefin based on the weight of TiCl$_3$, wherein the ratio of the infrared spectrum of said copolymer at 720 cm$^{-1}$: the infrared spectrum of said copolymer at 975 cm$^{-1}$ is in the range of 0.04 to 0.20.

2. The TiCl$_3$ catalyst composition according to claim 1 wherein said reduced solid TiCl$_3$ product contains about 15 to 25 weight percent of said copolymer.

3. The TiCl$_3$ catalyst composition according to claim 1 wherein the ratio of the infrared spectrums is in the range of 0.06 to 0.18.

4. The TiCl$_3$ catalyst composition according to claim 1 wherein said linear C$_8$–C$_{18}$ alpha-olefin has 8 carbon atoms.

5. The TiCl$_3$ catalyst composition according to claim 4 wherein the ratio of the infrared spectrums is in the range of 0.04 to 0.09.

6. The TiCl$_3$ catalyst composition according to claim 5 wherein the ratio of the infrared spectrums is in the range of 0.06 to 0.08.

7. The TiCl$_3$ catalyst composition according to claim 1 wherein said linear C$_8$–C$_{18}$ alpha-olefin has 12 carbon atoms.

8. The TiCl$_3$ catalyst composition according to clam 7 wherein the ratio of the infrared spectrums is in the range of 0.06 to 0.20.

9. The TiCl$_3$ catalyst composition according to claim 8 wherein the ratio of the infrared spectrums is in the range of 0.10 to 0.18.

10. The TiCl$_3$ catalyst composition according to claim 1 where said linear C$_8$–C$_{18}$ alpha-olefin has 18 carbon atoms.

11. The TiCl$_3$ catalyst composition according to claim 10 wherein the ratio of the infrared spectrums is in the range of 0.07 to 0.15.

12. The TiCl$_3$ catalyst composition according to claim 11 wherein the ratio of the infrared spectrums is in the range of 0.10 to 0.13.

13. The TiCl$_3$ catalyst composition according to claim 1 wherein said reduced solid TiCl$_3$ product is obtained by contacting TiCl$_4$ with an organoaluminum compound at a temperature in the range of about −50° C. to about 30° C.

14. The TiCl$_3$ catalyst composition according to claim 1 wherein said reduced solid TiCl$_3$ product containing about 5 to 35 weight percent of prepolymerized copolymer is treated with one of
    (a) a chlorinated hydrocarbon having at least 2 carbon atoms and a Lewis base complexing agent or
    (b) TiCl$_4$ and a Lewis base complexing agent.

15. A non-friable, Ziegler-type TiCl$_3$ catalyst composition containing about 5 to 35 weight percent of copolymer of propylene and linear C$_8$–C$_{18}$ alpha-olefin characterized in that the ratio of the infrared spectrum of said copolymer at 720 cm$^{-1}$: the infrared spectrum of said copolymer at 975 cm$^{-1}$ is in the range of 0.04 to 0.20.

16. The TiCl$_3$ catalyst composition according to claim 15 wherein the linear C$_8$–C$_{18}$ alpha-olefin has 8 carbon atoms and the ratio of the infrared spectrums is in the range of 0.04 to 0.09.

17. The TiCl$_3$ catalyst composition according to claim 15 wherein the linear C$_8$–C$_{18}$ alpha-olefin has 12 carbon atoms and the ratio of the infrared spectrums is in the range of 0.06 to 0.20.

18. The TiCl$_3$ catalyst composition according to claim 15 wherein the linear C$_8$–C$_{18}$ alpha-olefin has 18 carbon atoms and the ratio of the infrared spectrums is in the range of 0.07 to 0.15.

19. The method of preparing a non-friable, highly active Ziegler-type TiCl$_3$ catalyst composition comprising:
    (a) contacting TiCl$_4$ with an organoaluminum compound at a temperature in the range of about −50° C. to about 30° C. to produce a TiCl$_3$ reduced solid product,
    (b) contacting the reduced solid TiCl$_3$ product with an amount of a mixture of propylene and linear C$_8$–C$_{18}$ alpha-olefin under polymerization conditions to obtain a reduced TiCl$_3$ solid product containing about 5 to 35 weight percent of prepolymerized copolymer of propylene and linear C$_8$–C$_{18}$ alpha-olefin based on the weight of TiCl$_3$, wherein the ratio of the infrared spectrum of said copolymer at 720 cm$^{-1}$: to the infrared spectrum spectrum of said copolymer at 975 cm$^{-1}$ is in the range of 0.04 to 0.20, and
    (c) treating said prepolymerized reduced solid with one of (a) a chlorinated hydrocarbon having at least 2 carbon atoms and a Lewis base complexing agent of (b) TiCl$_4$ and a Lewis base complexing agent to convert the prepolymerized TiCl$_3$ reduced solid to a substantially non-friable highly active, crystalline prepolymerized TiCl$_3$ composition.

20. The method according to claim 19 wherein the ratio of the infrared spectrums is in the range of 0.006 to 0.18.

21. A Ziegler-type catalyst system for the polymerization of olefins comprising:
    (a) an organometal compound co-catalyst, and
    (b) a Ziegler-type TiCl$_3$ catalyst composition containing about 5 to 35 weight percent of copolymer of propylene and linear C$_8$–C$_{18}$ alpha-olefin characterized in that the ratio of the infrared spectrum of said copolymer at 750 cm$^{-1}$: the infrared spectrum of said copolymer at 975 cm$^{-1}$ is in the range of 0.04 to 0.20.

* * * * *